United States Patent [19]

Vokey et al.

[11] Patent Number: 5,349,182

[45] Date of Patent: Sep. 20, 1994

[54] FIBER OPTIC CABLE MOISTURE MONITORING SYSTEM

[75] Inventors: David E. Vokey, Bellingham, Wash.; Kenneth N. Sontag, Springfield, Canada; Heinrich Kraft, Rodental, Fed. Rep. of Germany

[73] Assignee: Norscan Instruments Ltd., Winnipeg, Canada

[21] Appl. No.: 152,368

[22] Filed: Nov. 16, 1993

Related U.S. Application Data

[62] Division of Ser. No. 868,658, Apr. 15, 1992, Pat. No. 5,262,639.

[51] Int. Cl.$^5$ ............................................. G01V 9/04
[52] U.S. Cl. .................... 250/227.21; 73/73
[58] Field of Search ............... 250/227.11, 227.21, 250/231.10, 227.18, 227.23; 73/73

[56] References Cited

U.S. PATENT DOCUMENTS

| | | |
|---|---|---|
| 4,071,753 | 1/1978 | Fulenwider et al. . |
| 4,260,883 | 4/1981 | Onoda et al. . |
| 4,408,123 | 10/1983 | Sichling et al. . |
| 4,480,251 | 10/1984 | McNaughton et al. . |
| 4,490,606 | 12/1984 | Lockett et al. . |
| 4,517,456 | 5/1985 | Halsall et al. . |
| 4,639,593 | 1/1987 | Stetson et al. . |
| 4,749,275 | 6/1988 | Shimomura et al. . |
| 4,866,265 | 9/1989 | Hohne ............... 250/227.11 |
| 4,902,327 | 2/1990 | Levinson . |
| 5,051,578 | 9/1991 | Slemon et al. . |
| 5,109,443 | 4/1992 | Hill et al. . |

FOREIGN PATENT DOCUMENTS 0161529 10/1982 Japan .
WO84/03768 9/1984 PCT Int'l Appl. .

OTHER PUBLICATIONS

European patent application 0170736 published Feb. 1986.
German patent application 3908903 published Sep. 1990.

Primary Examiner—David C. Nelms
Attorney, Agent, or Firm—Murray E. Thrift; Adrian D. Battison; Stanley G. Ade

[57] ABSTRACT

The invention provides a monitor for monitoring the condition of fibre optic communication cables. The system employs one or more of the optical fibres of a cable to monitor the cable structure for damage or kinks. By using two separate laser sources and simultaneously monitoring the optical losses at two distinct and separate wavelengths, the loss signature of the monitored fibre is determined, analyzed and related to the mechanical condition of the cable structure. To monitor splice points for moisture, a special optical splice sensor unit detects any penetration of water into the splice and transmits a coded alarm signal over the monitored fibre to the optical receiver. Every splice location is assigned a unique sensor code. The optical splice sensor is driven by moisture detection cell, which forms a single cell water activated battery. Water entering the monitored splice closure wets the tape, which activates the cell. The cell generates sufficient voltage and current to power timing, code generation and modulator circuits in the sensor unit for an extended period of time. The activated circuit drives a modulator which modulates the light travelling down the fibre. The modulated light is monitored at the equipment office and the address of the alarming sensor decoded.

13 Claims, 5 Drawing Sheets

FIBER OPTIC CABLE MOISTURE MONITORING SYSTEM

This application is a division of application Ser. No. 07/868,658, filed Apr. 15, 1992 U.S. Pat. No. 5,262,630.

FIELD OF THE INVENTION

The present invention relates to communication cable monitoring and more particularly to the monitoring of fibre optic communication cables.

BACKGROUND

Telephone and other communication cables are subject to damage and wear from environmental and man made causes. Severe weather conditions such as high winds, snow, icing, rain, floods, and lightning can damage exposed cables. Damage can result from nearby construction or vandalism. The ingress of rain or ground water into the cable core or splice closures at damage locations is a major cause of service interruptions (outages). Every effort is therefore made to keep the cable in good repair and water out of the cable structure.

Frequently, damage does not cause an immediate loss of service but results in a slow degradation of the cable system which often ends in failure of the cable and loss of service. Repair must then be carried out on an emergency basis, which is costly both in restoration costs and lost revenues.

Dating back to the first major cable installations, maintenance monitoring systems have been used to provide early warning of cable trouble. This allows the scheduling of maintenance to avoid lost service and costly repair. The earliest systems used air pressure to keep water out of breaches in the cable or splice closures and to detect damage by measuring the air flow rate into a cable section.

Modem telephone cables, including fibre optic cables, are often filled with water blocking compounds to prevent water migration into the cable core. While providing good resistance to water damage, the filling compounds also block or severely restrict air flow thus making air pressure monitoring systems useless. To overcome this limitation and to provide maintenance monitoring on filled telephone cables, all electronic systems were developed such as those described by McNaughton et al in U.S. Pat. No. 4,480,251 and Vokey et al in U.S. Pat. No. 5,077,526.

Fibre optic cables constructed for applications such as inclusion in overhead power transmission static wires or suspended below phase conductors on transmission towers use all dielectric insulating materials. As a result, conventional cable and splice monitoring methods, such as described by the McNaughton et al and Vokey et al patents which require a metallic electrical conductor element can not be applied.

OTDR techniques, which launch light pulses into a fibre and measure reflected energy to determine loss increases, have been used to monitor optical cables and splices. These methods are expensive and require a special moisture detecting fibre bending device in the splice closures in an attempt to monitor for water ingress. Additionally, the splice bending device is not always predictable in its performance and the exact optical distance to each splice must be known precisely. While it would be preferable to use an active detection device at the splice points, a major difficulty exists in that for all dielectric cable there is no practical means to supply electrical power to splice locations to operate such devices.

SUMMARY

The present invention addresses the above problems and in its various aspects provides mechanisms for monitoring the cable structure and the splice closures for damage or for moisture ingress.

According to one aspect of the present invention there is provided a moisture sensing signal generator comprising:

moisture detection cell means for generating a voltage in response to the contact of the cell means with water, an electrically operated code signal generating means coupled electrically to the cell means for generating a fault signal in response to receipt of electrical energy from the cell means and optical modulator means coupled electrically to the code signal generating means for generating a coded optical signal in response to generation of the fault signal.

This aspect of the invention provides a self contained mechanism for detecting moisture entry at a splice closure and signalling that moisture entry along the optical fibre. The preferred moisture detection cell is a tape containing two strips of dissimilar metals encased in a porous insulators and separated by a water soluble ionizing solid. The tape may be wrapped around the splice. When water comes into contact with the ionizing solid, an electrolyte is created and the cell becomes a voltaic cell driving the signal generating means.

According to another aspect of the present invention there is provided an optical splice sensor unit for signalling moisture penetration of a splice closure enclosing spliced ends of two optical fibre cables, the sensory unit comprising:

splice means in the splice closure for holding in alignment the ends of optical fibres from the respective cables;

displacement means for selectively displacing one of the fibre ends of one cable with respect to the respective fibre end of the other cable;

signal generating means coupled to the displacement means for selectively actuating the displacement means; and moisture detector means responsive to the presence of moisture in the enclosure for actuating the signal generator means.

The displacement means act as an optical modulator to modulate the light signal transmitted on the fibre being monitored. Preferably, the signal generating means modulate the light signal according to a code that is unique to the signal generator in question. This allows direct identification of the splice that has been penetrated by moisture.

According to another aspect of the present invention there is provided a fibre optic cable monitoring system for monitoring the physical condition of at least one optical fibre having first and second ends, the system comprising:

light signal transmitter means for generating two monitoring signals of light at different wave lengths and transmitting the monitoring signals into the first end of the fibre;

optical receiver means optically coupled to the second end of the fibre for receiving the monitoring signals; and signal processing means for separating the monitoring signals and measuring their magnitudes.

The signal losses are indicative of the condition of the cable. For example, with signals at wave lengths of 1300 nm and 1550 nm, a similar loss at both wave lengths can be attributed to microbending. Microbending could be a result of cable crushing or a temperature related change in the cable structure. A significant loss increase at 1550 nm only can be related to macrobending, usually caused by a kink in the cable or a buckling of the fibre.

Preferably, the optical signals are modulated at selected frequencies. The combined signals, when received, are convened to an electrical signal, which is then filtered to separate the two signals.

Light signals may be generated with two lasers and distributed over a number of fibres. The individual fibres are then monitored by separate receivers, and the receiver outputs are scanned by a multiplexer which provides output to a conventional monitoring alarm unit.

According to a further aspect of the present invention there is provided a method of monitoring an optical fibre comprising:

transmitting two light signals with different wave lengths along the fibre from a terminal end to a receiving end;
monitoring the two signals at the receiving end;
determining losses in the two signals; and
generating an alarm when a determined loss exceeds a predetermined maximum allowable loss.

These aspects of the present invention will be more fully described in the following detailed description in connection with the accompanying drawings.

BRIEF DESCRIPTION OF THE DRAWINGS

In the accompanying drawings which illustrate an exemplary embodiment of the present invention.

DETAILED DESCRIPTION

Figure 1:
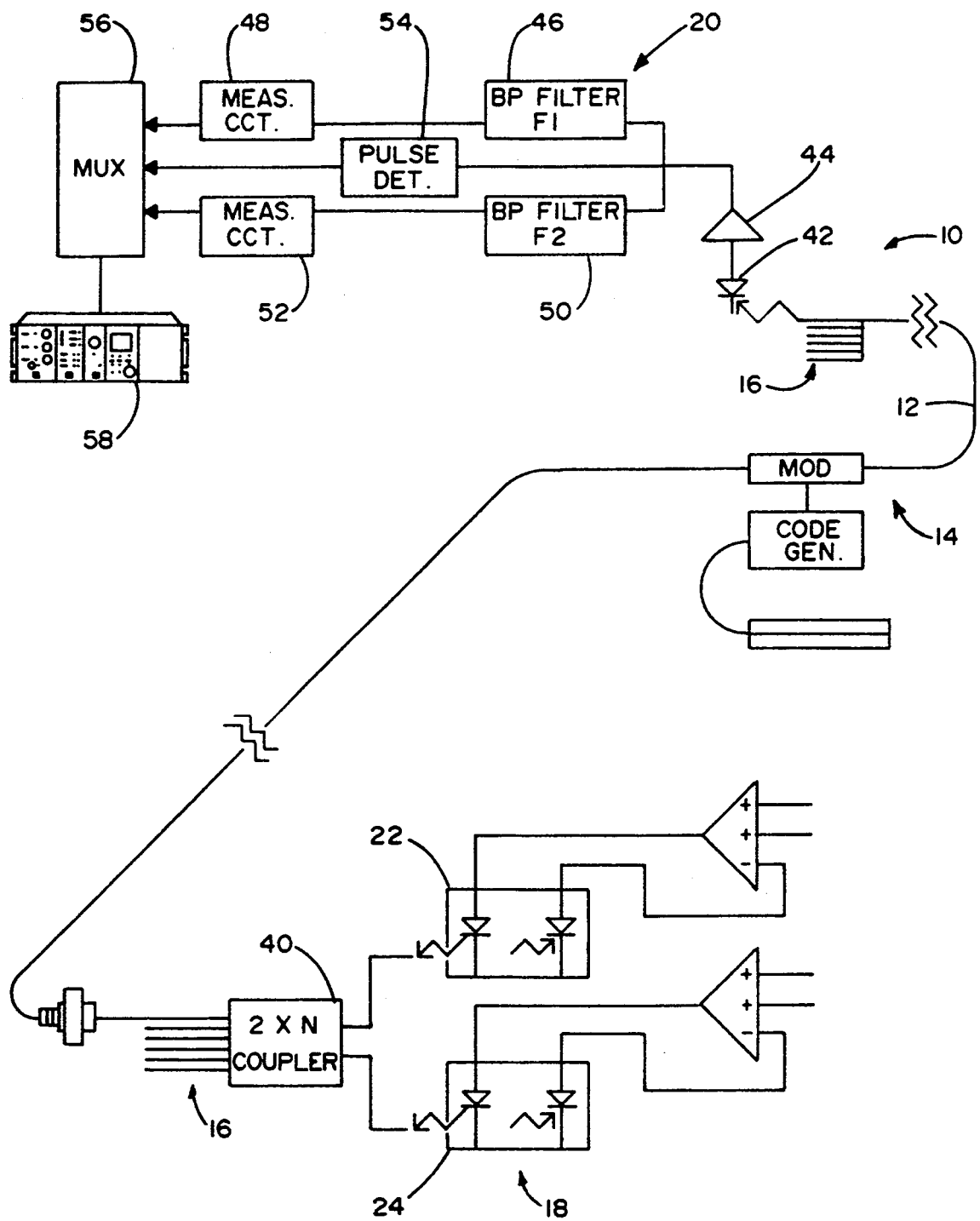
FIG. 1 is a schematic of a monitoring system according to the present invention.

Referring to the accompanying drawings, and especially FIG. 1, there is illustrated a fibre optic cable monitoring system 10 associated with a fibre optic cable 12. The illustrated cable is a single mode (sin) fibre cable with a length up to 100 km. The cable is shown as including a splice 14 part way along its length. Conventionally, the complete cable would include a number of splices. The cable includes a number of optical fibres 16.

Figure 2:
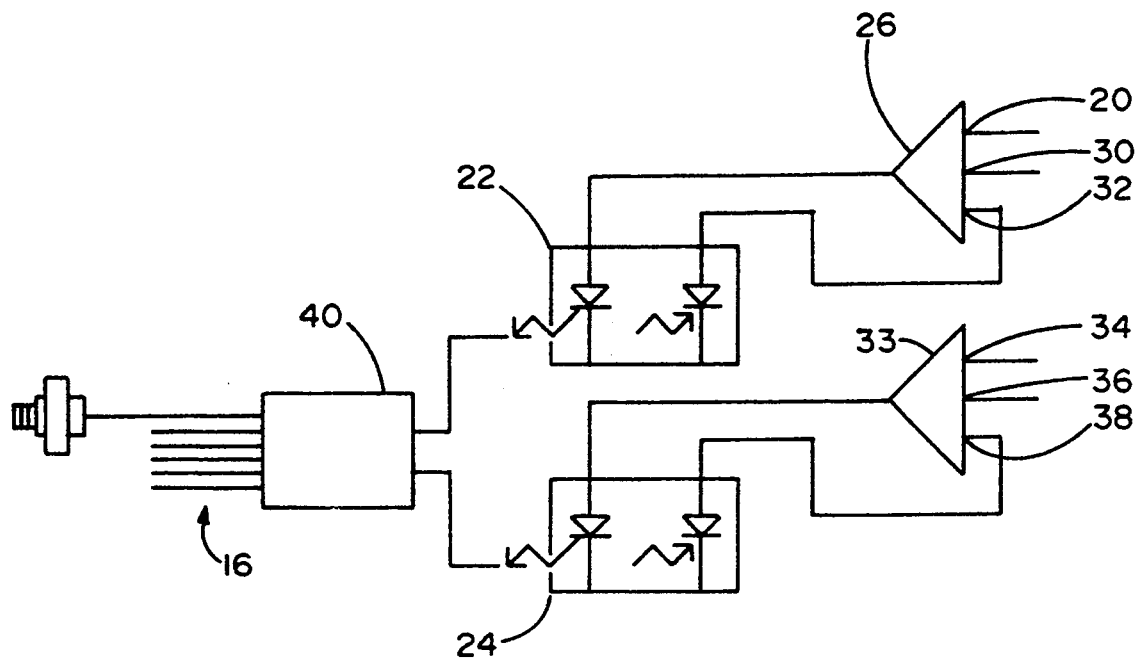
FIG. 2 is a schematic of a fibre optic transmitter.

The system 10 includes an optical transmitter unit 18 at one end of the cable and an optical receiver 20 at the other. As illustrated most particularly in FIG. 2, the optical transmitter is a dual wavelength laser transmitter including a stabilized laser source 22 emitting light with a wave length of 1300 nm and second stabilized laser source 24 emitting light with a wavelength of 1550 nm. The laser source 22 is connected to a modulating amplifier 26. The inputs to the amplifier include a modulating input 28 with bias input 30 and a negative feedback 32. The modulating input has a frequency F1 for modulating the transmitted 1300 nm light at that frequency. The laser 24 is likewise associated with an amplifier 33 with a modulating input 34, a bias input 36 and a negative feedback 38. The frequency of the modulating signal F2 is different from the modulating frequency F1. The lasers are mated to a wave division multiplex coupler 40. The coupler combines the light output of the lasers and divides the light energy equally to N output ports. A monitored fibre is connected to each of the output ports. Consequently, the single pair of lasers provides optical power to several monitored fibres or cables.

Figure 7:
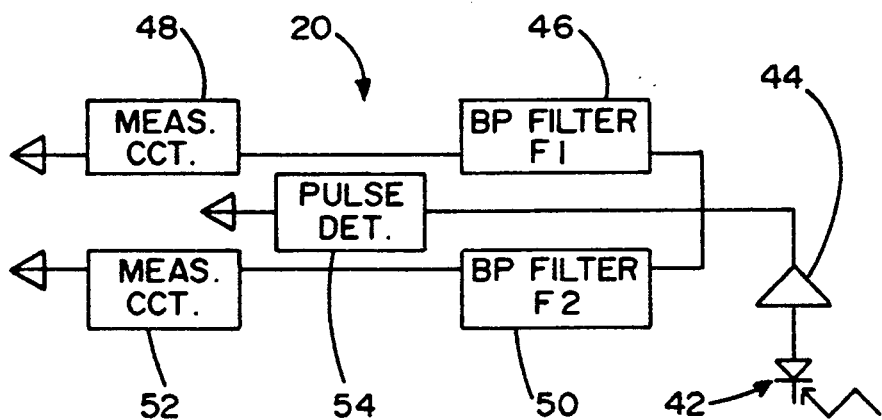
FIG. 7 is a schematic of an optical receiver.

At the receiving end of the fibre is an optical receiver 20 (FIG. 7) that intercepts and detects the laser light from each monitored fibre on a PIN detector diode 42. The light is converted by the diode to an electrical signal that is amplified by preamplifier 44. The electrical signal contains frequency components at F1 and F2, which are separated by band pass filters 46 and 50 and measured by measuring circuits 48 and 52. The optical loss of the fibre length at both wavelengths is calculated from the measured amplitudes.

The optical receiver also includes a pulse detector 54 for monitoring pulses generated in the optical sensor unit that will be described more fully in the following.

The output from the optical receivers are delivered to a multiplexer 56 which scans the outputs from the various monitored fibres and provides input to a central office terminal 58 that includes alarm circuits 58 for generating an alarm when a detected fibre loss exceeds a predetermined maximum loss. The terminal also includes a decoding circuit 60 for decoding the pulses from the pulse detector 54.

Figure 5:
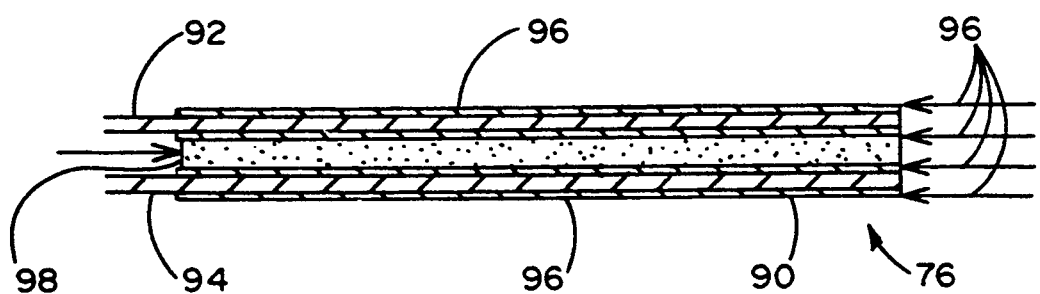
FIG. 5 is a sectional view of a moisture detection cell.
Figure 3:
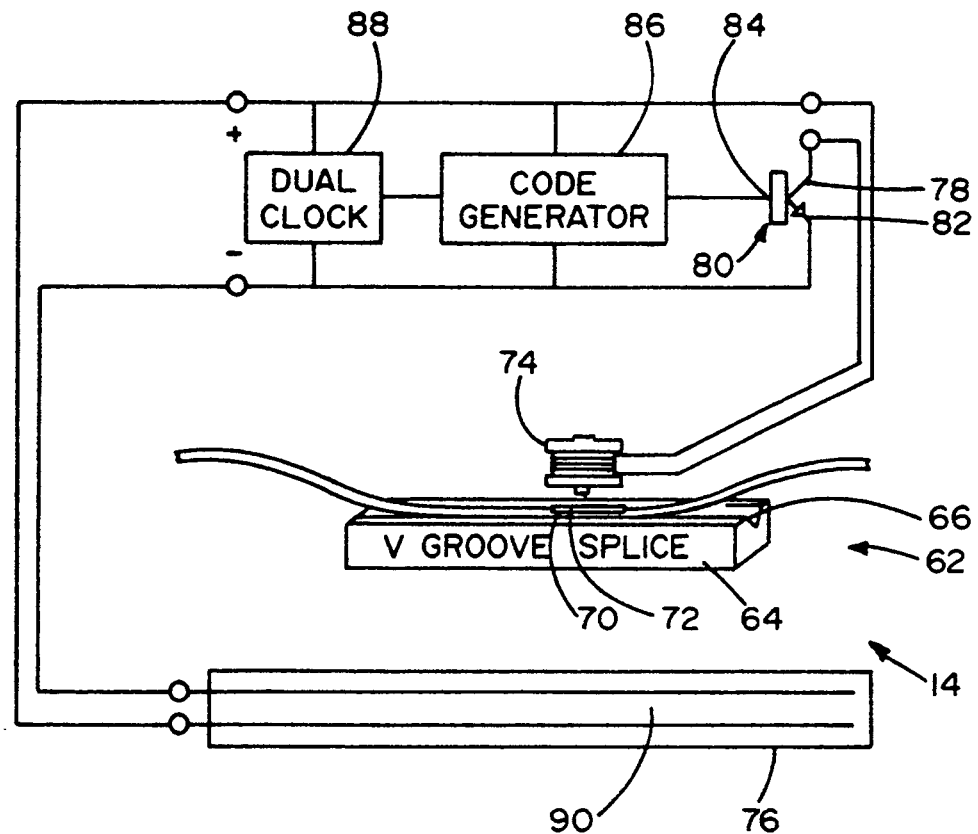
FIG. 3 is a schematic of an optical sensor unit.
Figure 4:
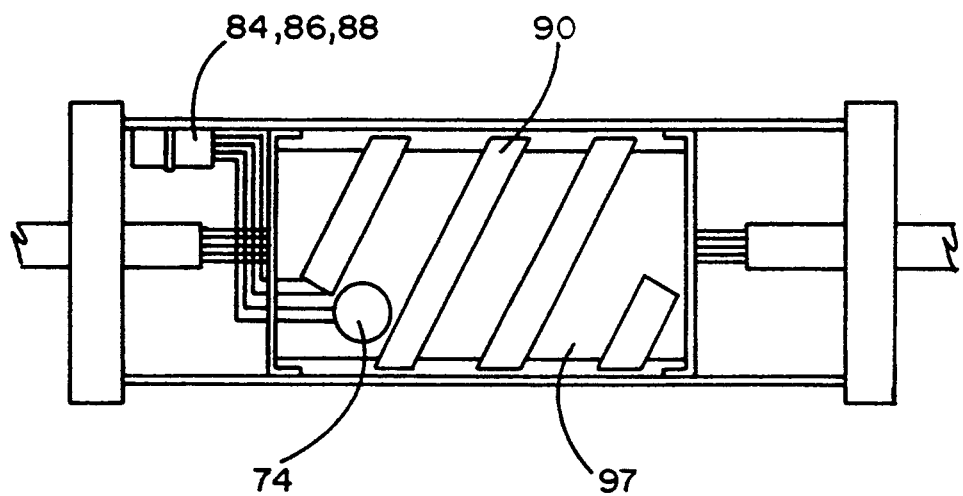
FIG. 4 is a sectional view of a splice.

Referring most particularly to FIGS. 3, 4 and 5, the splice 14 includes a modulator 62 for producing pulses in the light transmitted by each fibre for detection by the pulse detector 54. The modulator includes a splice 64 with a V-groove 66 which aligns ends of a monitored fibre through the cable splice. At the splice the fibre end 70 has a small ferrous metal element 72 bonded to its top surface. This is located immediately beneath one pole of a modulator electromagnet 74. The electromagnet is electrically connected between a moisture detection cell 76 and the collector 78 of a driver transistor 80. The emitter of the transistor is connected to the moisture detection cell 76 while the base 84 is connected to a code generator 86 which is in turn connected to a clock 88. Both the code generator and the clock are connected across the terminals of the moisture detection cell 76.

Figure 6:
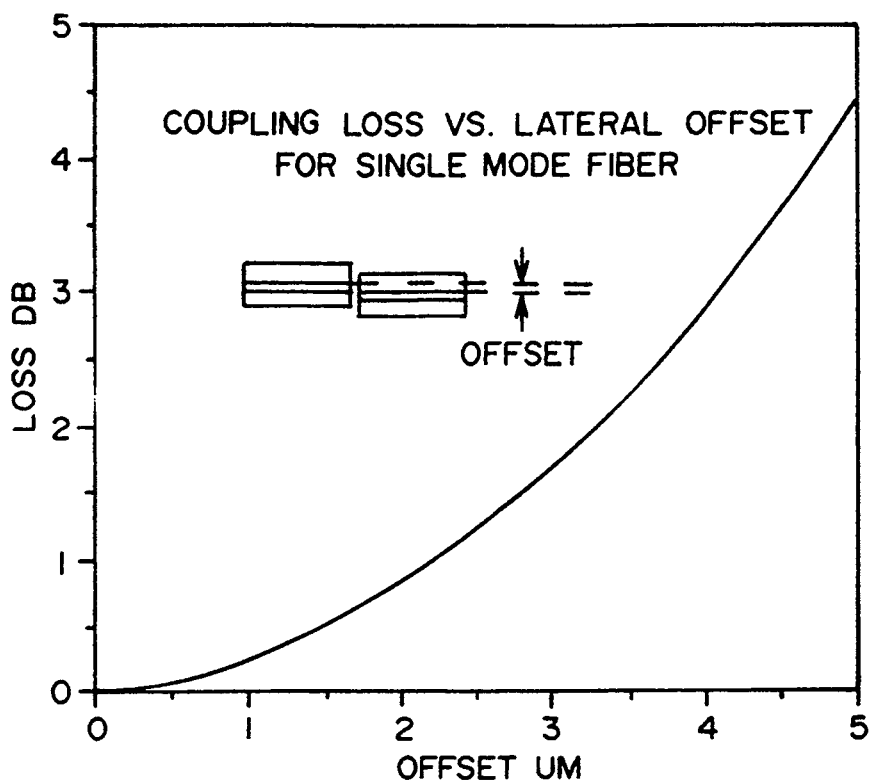
FIG. 6 is a graph showing fibre splice coupling losses v. fibre end offset.

The detection cell 76 is a one meter long tape 90 with a magnesium conductor 92 and copper conductor 94 extending the length of the tape. Each conductor is encased in and bonded to a water pervious insulating layer of pvc plastic. Between the two conductors, and isolated from them by the insulating material 96 is a water soluble, ionizable layer of copper sulfate. The moisture detection cell tape is, in use, wrapped around a splice tray 97 (FIG. 4) for organizing the splices. If moisture penetrates the splice closure, the water will dissolve the electrolyte salt, producing an electrolyte and activating the cell to produce a DC voltage. The separation of the components of the cell ensures an essentially infinite life under dry conditions. The cell then acts as a battery driving the clock, code generator, driver and modulator electromagnet. The driver provides coded current pulses to the electromagnet as controlled by the clock and the code generator. The current pulses in the electromagnetic coil set up magnetic pulses which attract the ferromagnetic element 72 bonded to the fibre end 70, thus pulling the fibre end out of alignment with the fibre end 68. As shown in FIG. 6, a misalignment of the fibre ends on the order 5 microns or more will significantly reduce the coupled light energy and result in an amplitude modulated pulse stream at a rate determined by the code generator.

Energy required to deflect the 125 micron glass fibre a distance of 5 to 10 microns is very small. These sensor circuits are designed using low voltage micro-watt CMOS integrated circuits. As a result, the one meter long single cell battery can power the modulator and related circuits for weeks. The detection of a wet splice is therefore assured.

The optical receiver intercepts and detects the laser light from the monitored fibre and converts it to an electric signal as previously discussed. Pulses detected by the pulse detector 54 are decoded in a decoding circuit to identify the splice closure where they are created. For this purpose, the code generator 86 for each splice closure will generate a unique pulse signal.

The optical losses over the fibre at the two monitoring signal wavelengths is calculated from the measured amplitude of each of the converted electrical signals. Any additional fibre loss over the nominal is analyzed.

If similar loss increases are detected at both wavelengths, then the loss increases can be attributed to microbending, which could be a result of cable crushing or a temperature related change in the cable structure. If a significant loss increase is detected at 1550 nm only, the problem can be related to macrobending, which is usually caused by a kink in the cable or a buckling of the fibre.

Figure 8:
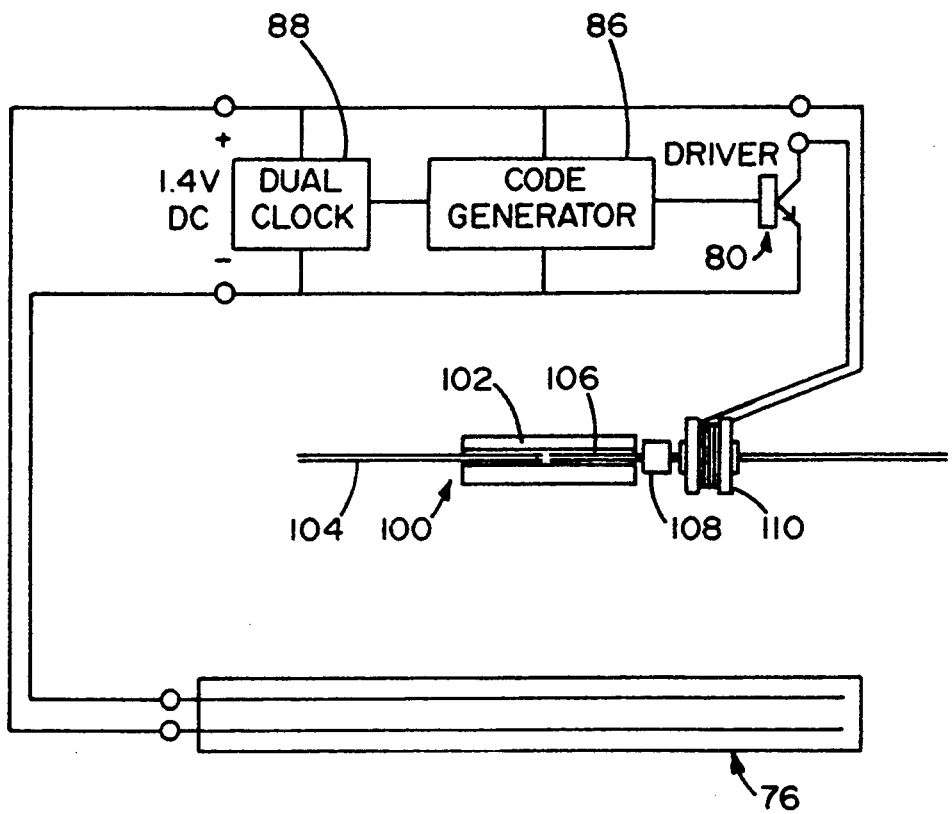
FIG. 8 is a schematic of an alternative embodiment of the optical sensor unit.

An alternative embodiment of the optical sensor unit is illustrated in FIG. 8. This embodiment differs from the embodiment of FIG. 3 in that the modulator uses a capillary splice 100 in which the fibre ends are aligned in a sleeve 102. One fibre end 104 is fixed. The other end 106 is movable but spring biased towards the fixed end. A ferrous sleeve 108 is fixed to the movable fibre end. A modulator coil 110 surrounds the fibre adjacent the sleeve 108. When energized, the coil draws the fibre end 106 away from the fibre end 104. This modulates the signal on the fibre.

Figure 9:
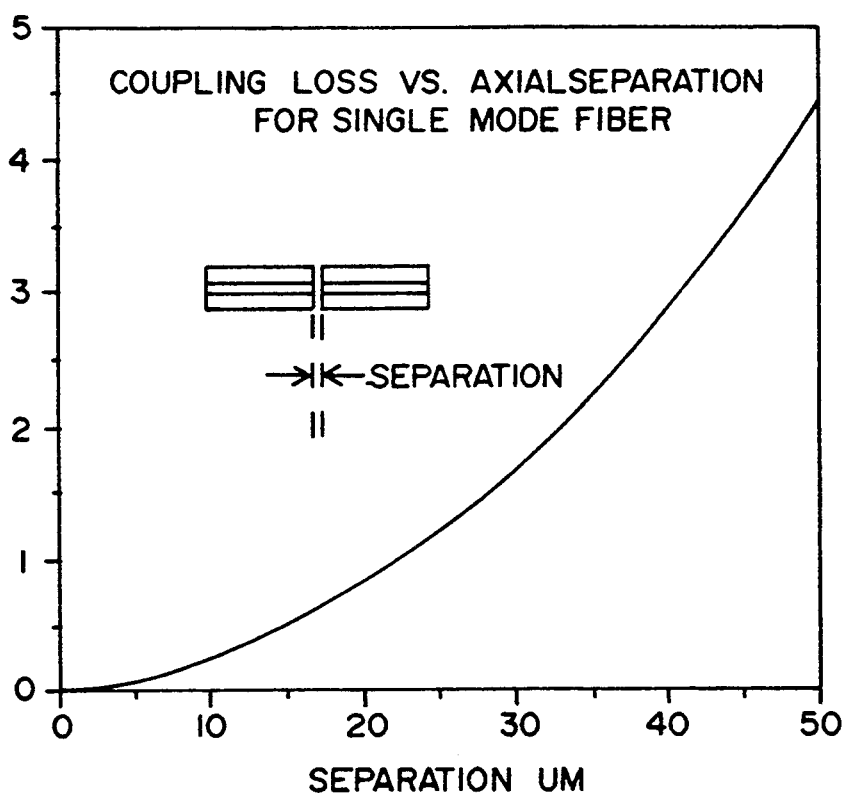
FIG. 9 is a graph showing fibre splice coupling losses v. fibre end axial separation.

The coupling loss v. axial fibre end separation curve is given at FIG. 9. The fibre movements are an order of magnitude greater than the offsets required to produce the same coupling loss.

The modulator splice and the associated electrical and mechanical devices may not conveniently be fitted into a splice tray or other splice organizer used in the splice closure. An appropriate location on the back or side of the tray may then be used.

While one embodiment of the present invention has been described in the foregoing, it is to be understood that other embodiments are possible within the scope of the invention. Thus, for example, the optical sensor unit may employ modulators other than the electromagnetic ones illustrated. For example, a piezoelectric crystal or some other electromechanical modulation device can be used to convert the electrical pulses to mechanical displacement and consequently coupling losses. Any other device acting as an optical switch may also be employed. The moisture detection cell may be fabricated from any two metals selected to provide appropriate half cell reactions in the presence of a suitable electrolyte. It is therefore to be understood that this invention is not to be considered limited to the specific embodiment disclosed. The invention is to be considered limited solely by the scope of the appended claims.

We claim:

1. A moisture sensing signal generator comprising: an electrically operated code signal generating means for generating a fault signal in response to receipt of electrical energy, optical modulator means coupled to the code signal generating means for generating a coded optical signal in response to generation of the fault signal, and electrolytic cell means connected electrically to the code signal generating means, the cell means being inactive when dry and being activated in response to contact with water to generate electrical energy and to supply electrical energy to the code signal generating means.

2. A signal generator according to claim 1 wherein the moisture detection cell means comprises two dissimilar metal components and a water soluble ionizing solid between the metal components.

3. A signal generator according to claim 2 including porous electrical insulating means between the ionizing solid and each metal component.

4. A signal generator according to claim 3 wherein each metal component comprises an elongate strip encased in the porous electrical insulating material.

5. A signal generator according to claim 4 wherein the metal components and the ionizing solid comprise a moisture detecting tape.

6. A signal generator according to claim 5 wherein one of the metal components is magnesium, the other metal component is copper and the ionizing solid is copper sulfate.

7. A signal generator according to claim 1 wherein the code signal generating means comprise means for generating an electrical signal.

8. A signal generator according to claim 7 wherein the code signal generating means comprise means for generating a pulsed electrical signal.

9. An optical splice sensor unit for signalling moisture penetration of a splice closure enclosing spliced ends of two optical fibre cables, the sensor unit comprising:
   splice means in the splice closure for holding in alignment the ends of optical fibres from the respective cables;
   displacement means for selectively displacing one of the fibre ends of one cable with respect to the respective fibre end of the other cable;
   signal generating means coupled to the displacement means for selectively actuating the displacement means; and
   moisture detector means responsive to the presence of moisture in the enclosure for actuating the signal generating means, the moisture detector means comprising a moisture detection cell means for generating a voltage in response to contact of the cell means with water.

10. A sensor unit according to claim 9 wherein the moisture detector means comprise an elongate tape wrapped around the splice means.

11. A sensor unit according to claim 10 wherein the moisture detector means comprise two spaced apart metal components extending substantially the length of the tape and a water soluble, ionizing solid between the two metal components.

12. A sensor unit according to claim 9 wherein the signal generating means comprise means for generating a coded electrical signal.

13. A sensor according to claim 12 wherein the displacement means comprise a magnetic member coupled to said one fibre end and an electromagnet adjacent the magnetic member and coupled electrically to the signal generating means.

* * * * *